US010669766B2

(12) United States Patent
Sakiyama et al.

(10) Patent No.: US 10,669,766 B2
(45) Date of Patent: Jun. 2, 2020

(54) OPENING/CLOSING BODY DRIVING DEVICE

(71) Applicant: MITSUBA Corporation, Gunma (JP)

(72) Inventors: Takahiro Sakiyama, Gunma (JP); Takashi Takizawa, Gunma (JP)

(73) Assignee: MITSUBA Corporation, Gunma (JP)

( * ) Notice: Subject to any disclaimer, the term of this patent is extended or adjusted under 35 U.S.C. 154(b) by 86 days.

(21) Appl. No.: 16/027,273

(22) Filed: Jul. 4, 2018

(65) Prior Publication Data

US 2019/0010746 A1 Jan. 10, 2019

(30) Foreign Application Priority Data

Jul. 5, 2017 (JP) .................. 2017-131766

(51) Int. Cl.
*F16H 25/20* (2006.01)
*E05F 15/622* (2015.01)
*F16H 21/44* (2006.01)
*E05F 15/63* (2015.01)

(52) U.S. Cl.
CPC ............ *E05F 15/622* (2015.01); *E05F 15/63* (2015.01); *F16H 21/44* (2013.01); *F16H 25/20* (2013.01); *E05Y 2201/624* (2013.01); *E05Y 2900/548* (2013.01); *F16H 2025/2043* (2013.01); *F16H 2025/2068* (2013.01); *F16H 2025/2075* (2013.01); *F16H 2025/2087* (2013.01)

(58) Field of Classification Search
CPC ........ F16H 21/44; F16H 25/20; E05F 15/622; E05F 15/63
See application file for complete search history.

(56) References Cited

U.S. PATENT DOCUMENTS

| 5,037,145 | A | * | 8/1991 | Wilkes | ............... E05B 81/25 |
| | | | | | 292/201 |
| 5,046,377 | A | * | 9/1991 | Wilkes | ............... E05B 81/25 |
| | | | | | 384/129 |
| 5,557,976 | A | * | 9/1996 | Moribayashi | ......... F02N 15/046 |
| | | | | | 74/7 A |
| 6,018,223 | A | * | 1/2000 | Oruganty | ................. B60S 1/08 |
| | | | | | 318/10 |
| 6,516,567 | B1 | * | 2/2003 | Stone | ............... E05F 15/622 |
| | | | | | 296/55 |
| 7,350,628 | B2 | * | 4/2008 | Adoline | .................. F16F 3/04 |
| | | | | | 188/67 |
| 8,596,153 | B2 | * | 12/2013 | Arenz | ............... E05F 15/627 |
| | | | | | 49/337 |

(Continued)

FOREIGN PATENT DOCUMENTS

JP  2011080320  4/2011

*Primary Examiner* — David M Fenstermacher
(74) *Attorney, Agent, or Firm* — JCIPRNET

(57) ABSTRACT

An opening/closing body driving device for driving an opening/closing body is provided. The opening/closing body driving device includes: a motor, having a rotation shaft; a screw shaft, being rotated by the rotation shaft; a moving nut, being screwed to the screw shaft and moved in an axial direction of the screw shaft; and a connection part, being provided at the moving nut, wherein an arm for opening and closing the opening/closing body is connected to the connection part. The rotation shaft and the screw shaft are respectively provided on the same axis, and the connection part is provided at a radially outer side of the screw shaft.

9 Claims, 8 Drawing Sheets

(56) References Cited

U.S. PATENT DOCUMENTS

| | | | | |
|---|---|---|---|---|
| 9,222,296 B2* | 12/2015 | Hamminga | ............. | E05F 15/41 |
| 2006/0027955 A1* | 2/2006 | Adoline | .................. | F16F 1/128 |
| | | | | 267/64.12 |
| 2014/0137477 A1* | 5/2014 | Ooe | ...................... | E05F 1/1091 |
| | | | | 49/358 |
| 2019/0194999 A1* | 6/2019 | Kerr | ...................... | E05F 15/622 |

* cited by examiner

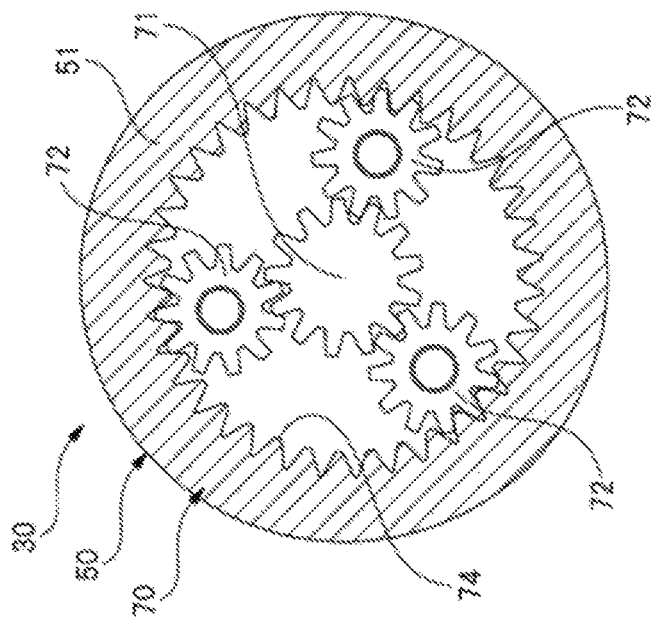
FIG. 5(a) [A-A section]
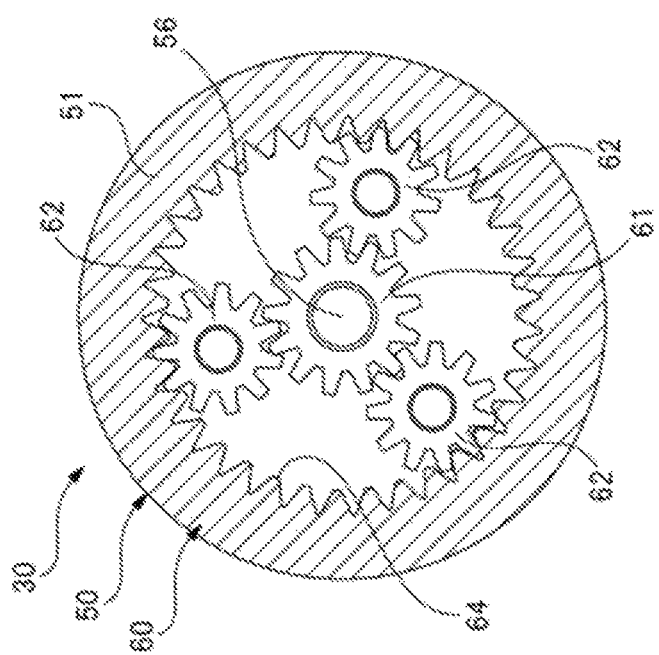
FIG. 5(b) [B-B section]

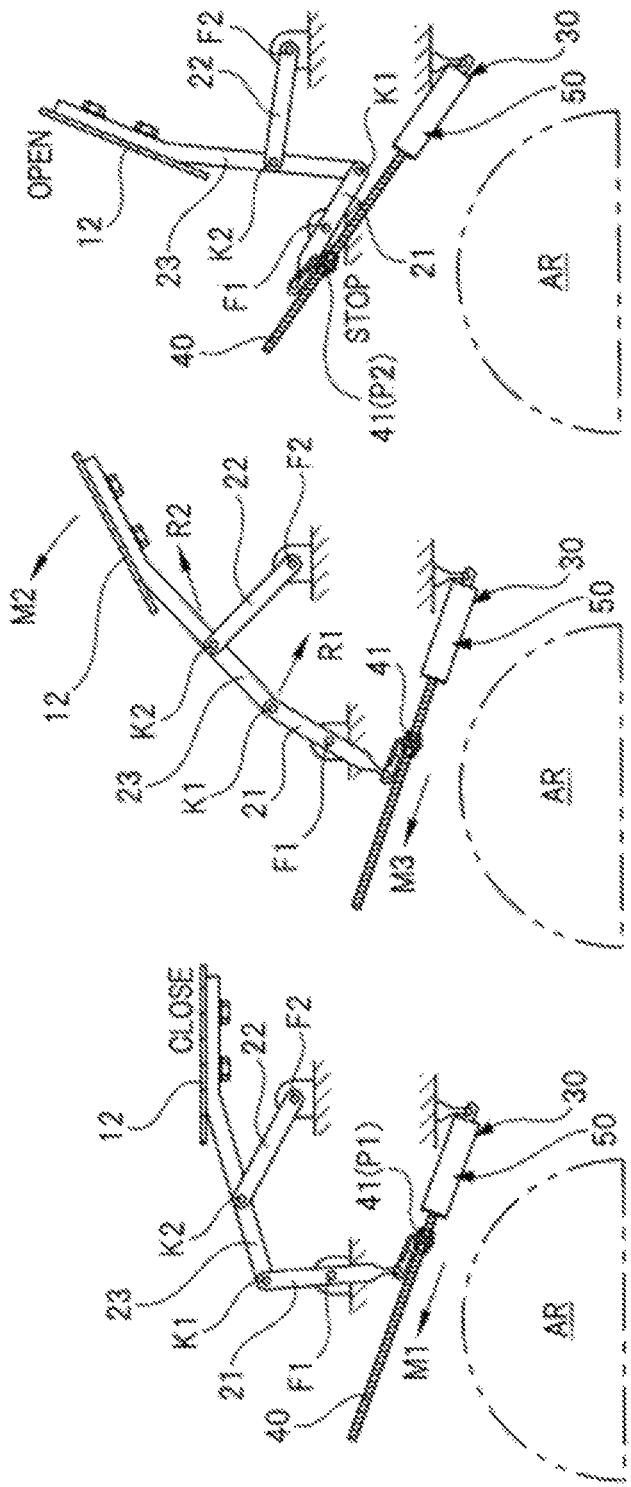

OPENING/CLOSING BODY DRIVING DEVICE

CROSS-REFERENCE TO RELATED APPLICATION

This application claims the priority benefit of Japanese application serial no. 2017-131766, filed on Jul. 5, 2017. The entirety of the above-mentioned patent application is hereby incorporated by reference herein and made a part of this specification.

TECHNICAL FIELD

The disclosure relates to an opening/closing body driving device for opening/closing an opening/closing body such as a trunk lid provided in a vehicle such as an automobile.

DESCRIPTION OF RELATED ART

Conventionally, a trunk for storing a spare tire and luggage is provided at the rear side of a vehicle such as an automobile. The trunk is openable and closable by a trunk lid (an opening/closing body), and the trunk lid is attached to the vehicle via arms (hinges, link mechanisms, etc.) provided at both sides in the vehicle width direction. Particularly, in large passenger cars or the like, the trunk lids are large and heavy, so some of the trunk lids are opened and closed by a driving device.

A technique for opening and closing a trunk lid with a driving device is described in Patent Document 1, for example. A driving unit (driving device) described in Patent Document 1 includes an elongated screw rod and a slider screwed to the screw rod to be moved in the axial direction of the screw rod. Also, at the base end part of the screw rod, a housing is provided to accommodate a speed reducing device, and a motor is arranged so as to be parallel to the screw rod.

That is, the speed reducing device is provided at the base end side of the screw rod and the motor in the axial direction, whereby the rotation speed of the motor is reduced and the torque is increased. Then, a rotating force with the increased torque is transmitted to the screw rod, and the slider is moved through rotation of the screw rod. A trunk lid hinge is connected to the slider, by which the hinge moves to open and close the trunk lid.

RELATED ART

Patent Document

[Patent Document 1] Japanese Laid-Open No. 2011-080320

SUMMARY

Problem to be Solved

Meanwhile, in order to increase the capacity of the trunk, the driving device installed in the trunk needs to be made as small as possible. However, the driving device described in Patent Document 1 adopts a so-called "two-axis structure" in which the screw rod and the motor are arranged to be parallel to each other.

Therefore, the width direction dimension of the driving device in the direction in which the screw rod and the motor overlap becomes larger, which in turn requires a relatively large mounting space in the vertical and horizontal directions of the vehicle. Accordingly, the design flexibility of the vehicle side is low.

Also, the housing at the base end side of the screw rod and the motor in the axial direction accommodates a speed reduction mechanism that generates high torque in addition to supporting the screw rod and the motor in a cantilever manner. Therefore, the rigidity of the housing needs to be reinforced by using a thick steel material or the like, and the weight is also increased.

The disclosure provides an opening/closing body driving device whose weight and width direction dimension can be reduced.

Solution to the Problem

An embodiment of the disclosure provides an opening/closing body driving device for driving an opening/closing body. The opening/closing body driving device includes a motor having a rotation shaft, a screw shaft rotated by the rotation shaft, a moving nut screwed to the screw shaft and moved in an axial direction of the screw shaft, and a connection part provided at the moving nut. An arm for opening and closing the opening/closing body is connected to the connection part, the rotation shaft and the screw shaft are respectively provided on the same axis, and the connection part is provided at a radially outer side of the screw shaft.

According to another embodiment of the disclosure, a planetary gear speed reducer that reduces a rotation of the rotation shaft is provided between the rotation shaft and the screw shaft.

According to another embodiment of the disclosure, the opening/closing body is a trunk lid provided at the rear of a vehicle, and the rotation shaft is provided at a rear side of the vehicle with respect to the screw shaft.

According to another embodiment of the disclosure, when the trunk lid is closed, the moving nut is arranged at a first position close to the rotation shaft in the axial direction of the screw shaft, and when the trunk lid is opened, the moving nut is arranged at a second position distant from the rotation shaft with respect to the first position in the axial direction of the screw shaft.

According to another embodiment of the disclosure, the rotation shaft is rotatably accommodated in a motor case, and an elastic member is provided between the motor case and the moving nut to urge the moving nut in a direction away from the motor case.

Technical Effects

According to the disclosure, since the rotation shaft and the screw shaft are respectively provided on the same axis and the connection part is provided at the radially outer side of the screw shaft, it is possible to realize the opening/closing body driving device in a so-called "one-axis structure".

In this way, the width direction dimension of the opening/closing body driving device can be reduced by making the driving device substantially rod-shaped, and when the driving device is applied to opening and closing the trunk lid provided at the rear of the vehicle, the capacity of the trunk can be made larger than before. In this case, since the opening/closing body driving device is substantially rod-shaped, the opening/closing body driving device can be installed so as to extend in the front-rear direction of the vehicle in which a space margin is provided without compromising the design flexibility of the vehicle side.

In addition, when the speed reducing device is provided, since it can be provided coaxially to both the rotation shaft and the screw shaft, a housing with increased rigidity as required in the related art is unnecessary. Therefore, it is possible to reduce the weight of the opening/closing body driving device.

BRIEF DESCRIPTION OF THE DRAWINGS

FIG. 5(a) is a sectional view taken along a line A-A of FIG. 4, and FIG. 5(b) is a sectional view taken along a line B-B of FIG. 4.

FIGS. 6(a), 6(b) and 6(c) are views for illustrating operation of the trunk lid driving device.

DESCRIPTION OF THE EMBODIMENTS

Hereinafter, Embodiment 1 of the disclosure will be described in detail with reference to the drawings.

Figure 1:
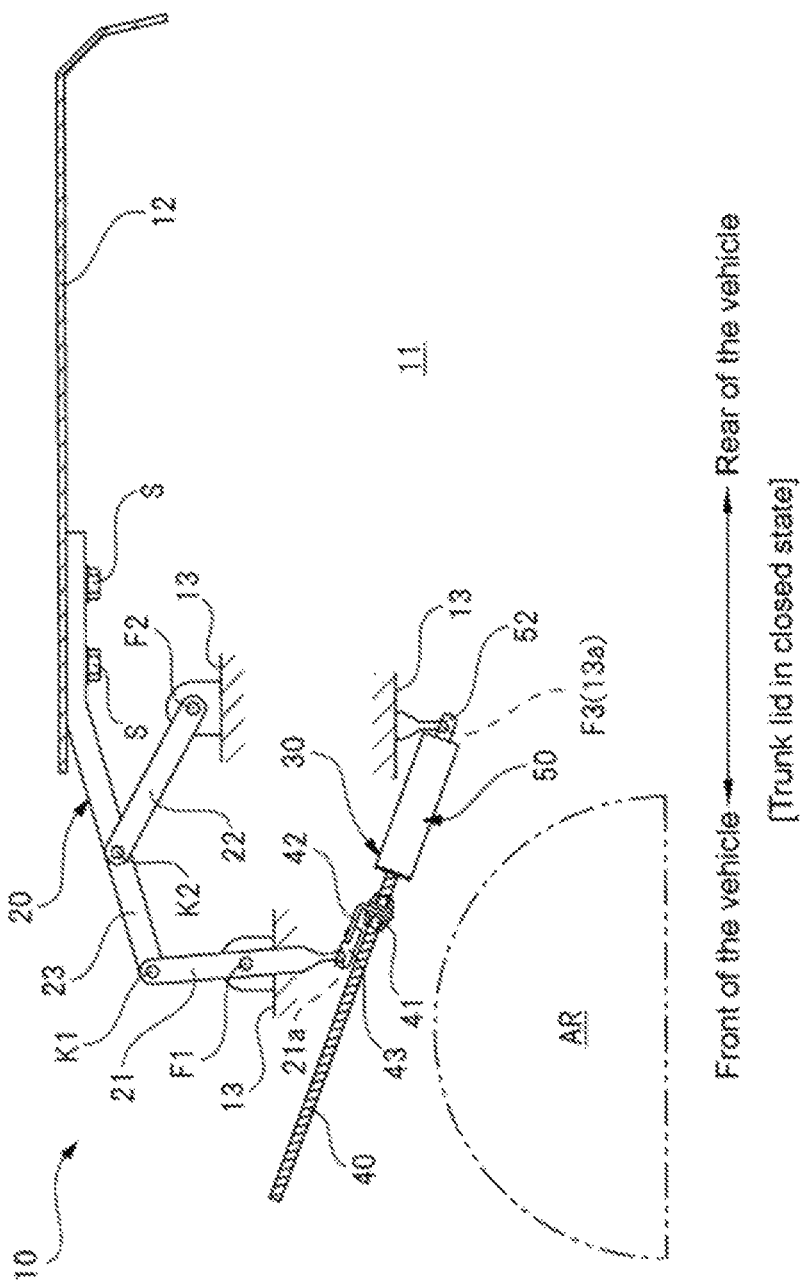
FIG. 1 is a schematic view (closed state) of a vehicle equipped with a trunk lid driving device.
Figure 2:
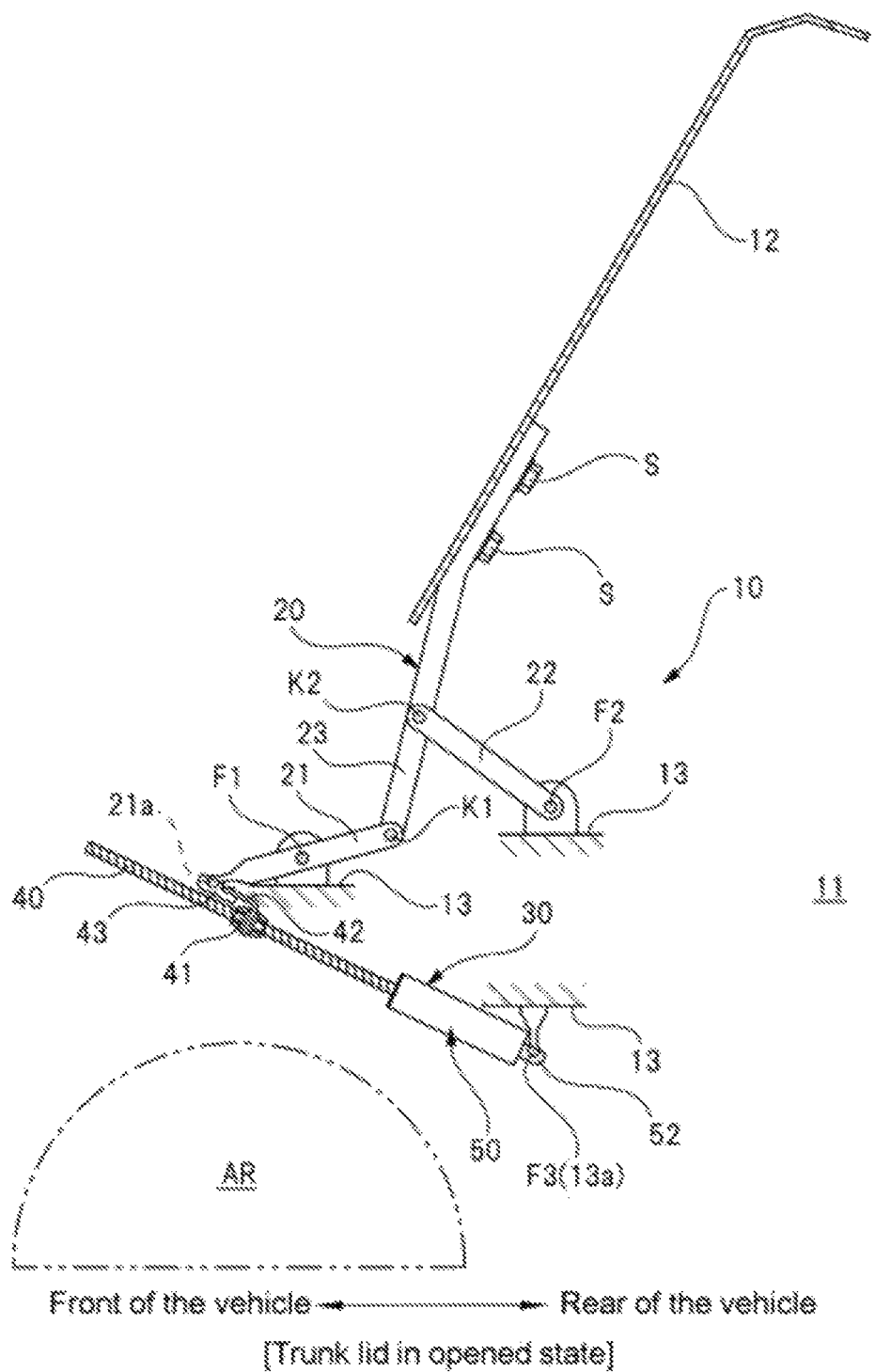
FIG. 2 is a schematic view (opened state) of the vehicle equipped with the trunk lid driving device.
Figure 3:
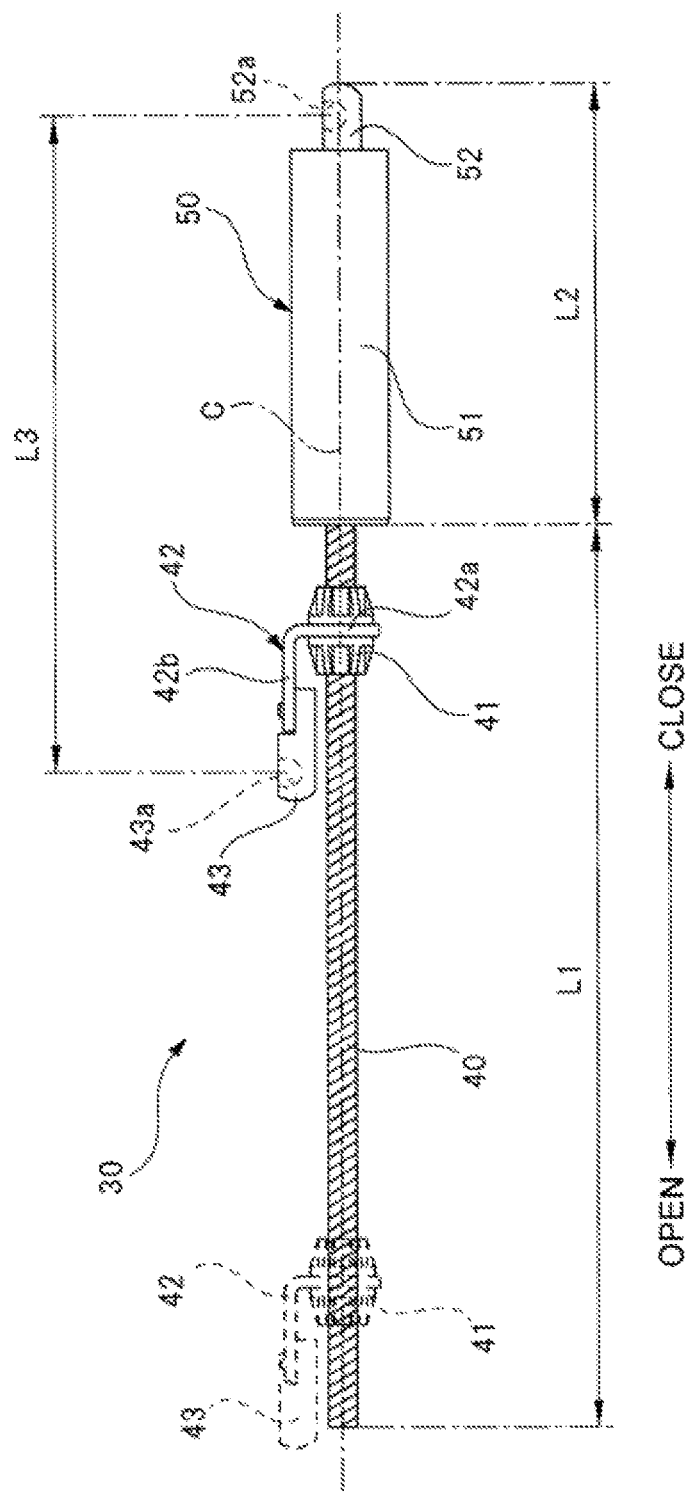
FIG. 3 is a plan view showing the trunk lid driving device alone.
Figure 4:
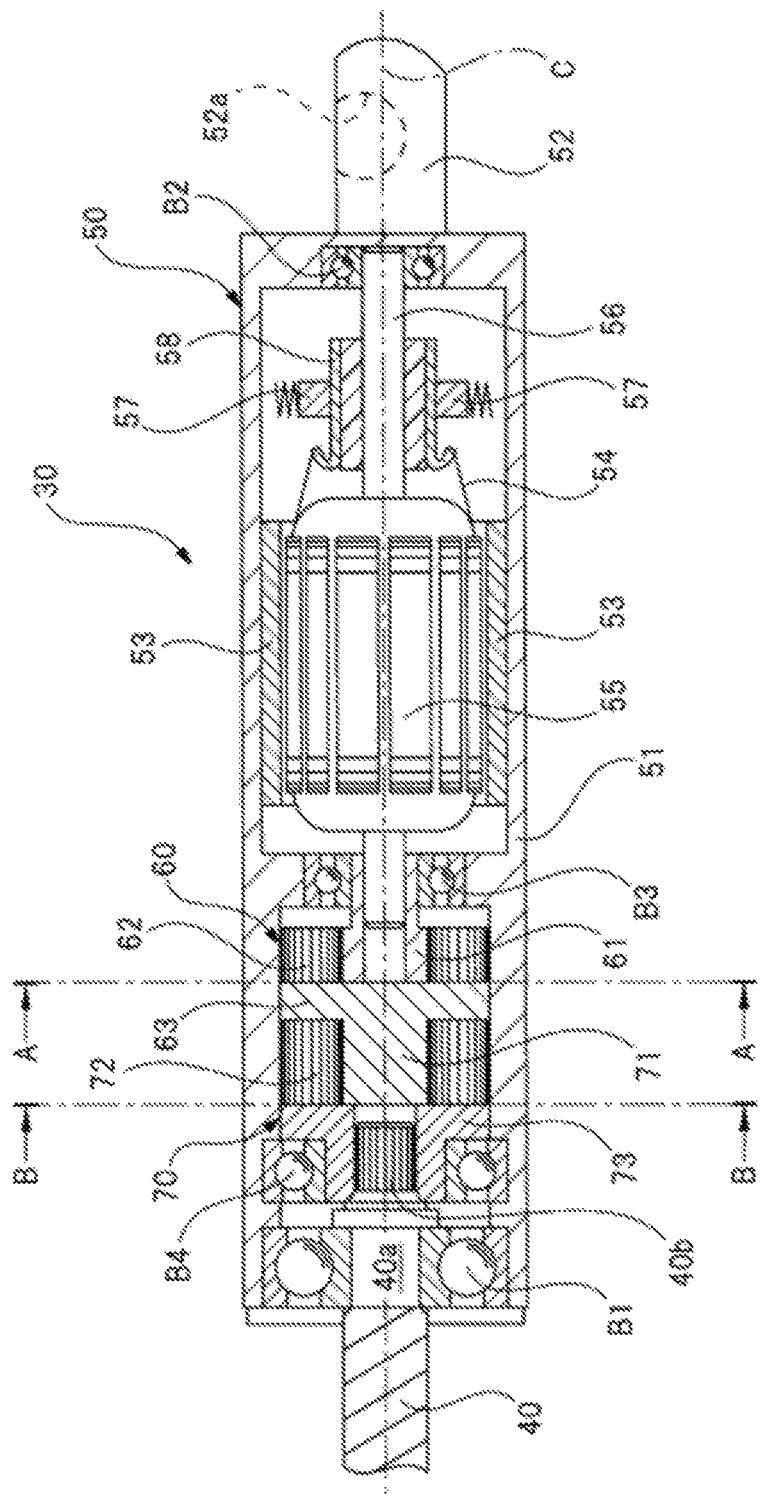
FIG. 4 is a sectional view showing the internal structure of the trunk lid driving device.

FIG. 1 illustrates a schematic view (closed state) of a vehicle equipped with a trunk lid driving device, FIG. 2 illustrates a schematic view (opened state) of the vehicle equipped with the trunk lid driving device, FIG. 3 illustrates a plan view showing the trunk lid driving device alone, FIG. 4 illustrates a sectional view showing the internal structure of the trunk lid driving device, FIG. 5(a) illustrates a sectional view taken along a line A-A of FIG. 4, FIG. 5(b) illustrates a sectional view taken along a line B-B of FIG. 4, and FIGS. 6(a), 6(b), and 6(c) respectively illustrate views showing operation of the trunk lid driving device.

FIG. 1 and FIG. 2 show the rear side of a so-called sedan type (3-box) vehicle 10. In this vehicle 10, an engine room (not shown), a passenger compartment (not shown) and a trunk 11 are arranged in this order from the front side (the left side in the figure) to the rear side (the right side in the figure) of the vehicle 10. The engine room, the passenger compartment, and the trunk 11 are independent spaces.

An opening portion (not shown) of the trunk 11 is openable and closable by a trunk lid 12 that serves as an opening/closing body. At both sides of the trunk lid 12 along the vehicle width direction, a pair of link mechanisms 20 (only one is shown in the figure) is provided. These link mechanisms 20 support the vehicle front side of the trunk lid 12, and through operation of the link mechanisms 20, the trunk lid 12 is set from the closed state shown in FIG. 1 to the opened state shown in FIG. 2.

As shown in FIG. 2, in the opened state of the trunk lid 12, the vehicle rear side of the trunk lid 12 is widely opened relative to the vehicle body 13 forming the vehicle 10. As a result, it is possible to easily load and unload large luggage and the like.

At the side of the link mechanism 20 opposite to the side of the trunk lid 12, a trunk lid driving device (the opening/closing body driving device) 30 driving the link mechanism 20 to open and close the trunk lid 12 is provided. This trunk lid driving device 30 is provided at one of the pair of link mechanisms 20, and in the present embodiment, it is provided at the driver's seat side in the vehicle width direction.

Here, the trunk lid 12 is lightweight, unlike a rear gate provided at the rear of a minivan or the like, so the trunk lid 12 can be fully opened and closed with one trunk lid driving device 30. However, when the weight of the trunk lid 12 is increased, the trunk lid driving device 30 can be provided in correspondence to each link mechanism of the pair of link mechanisms 20.

Then, in the closed state of the trunk lid 12, the link mechanism 20 and the trunk lid driving device 30 are accommodated in a narrow installation space, which is inside a rear quarter panel (not shown) of the vehicle 10 and avoids a tire house interference region AR.

The link mechanism 20 includes a drive link 21 swung by the trunk lid driving device 30, a follower link 22 swung in conjunction with the swing motion of the drive link 21, and an intermediate link 23 provided between the drive link 21 and the follower link 22.

A substantially middle portion in the longitudinal direction of the drive link 21 is rotatably supported by a first fixed joint part F1 provided on the vehicle body 13. A first ball part 21a is provided in the longitudinal direction base end part of the drive link 21, and the first ball part 21a is rotatably connected to a first socket 43 attached to a moving nut 41 of the trunk lid driving device 30. That is, the joint structure between the drive link 21 and the moving nut 41 is a ball joint. Furthermore, the longitudinal direction distal end part of the drive link 21 is rotatably supported with respect to the longitudinal direction base end part of the intermediate link 23 via the first movable joint part K1.

The length dimension of the follower link 22 is substantially the same as the length dimension of the drive link 21. The longitudinal direction base end part of the follower link 22 is rotatably supported by a second fixed joint part F2 provided on the vehicle body 13. Here, the second fixed joint part F2 is arranged at the rear side of the vehicle 10 with respect to the first fixed joint part F1, and is arranged at the upper side (the upper side in the figure) of the vehicle 10 with respect to the first fixed joint part F1.

The portion of the vehicle body 13 between the first fixed joint part F1 and the second fixed joint part F2 functions as a fixed link (not shown) of the link mechanism 20. That is, the link mechanism 20 in the present embodiment is a "four-joint link mechanism" including the drive link 21, the follower link 22, the intermediate link 23 and the fixed link.

In addition, the longitudinal direction distal end part of the follower link 22 is rotatably supported with respect to the substantially middle portion in the longitudinal direction of the intermediate link 23 via the second movable joint part K2. As a result, the follower link 22 is also swung in conjunction with the swing motion of the drive link 21, so that the intermediate link 23 is driven to stand up or lie down.

Accordingly, the trunk lid 12 provided at the longitudinal direction distal end part of the intermediate link 23 is opened and closed (see the states of FIG. 1 and FIG. 2). In addition, the longitudinal direction distal end part of the intermediate link 23 is firmly fixed to the vehicle front side of the trunk lid 12 by two fastening members S. Here, the drive link 21 connected to the trunk lid driving device 30 constitutes an arm in the disclosure. That is, the drive link 21 operates to open and close the trunk lid 12 through driving of the trunk lid driving device 30.

As shown in FIG. 1 to FIG. 4, the trunk lid driving device 30 is configured by arranging a screw shaft 40 and a motor part 50 on the same axis C, and is formed in an elongated rod shape. In this way, the trunk lid driving device 30 is a so-called "one-axis structure" actuator. A length dimension L1 of the screw shaft 40 in the axial direction is substantially twice a length dimension L2 of the motor part 50 in the axial direction (L1≈2×L2).

The axial direction base end side of the motor part 50 is rotatably supported by a third fixed joint part F3 provided on the vehicle body 13 via a second socket 52. Here, the third fixed joint part F3 is a second ball part 13a rotatably connected to the second socket 52. That is, the joint structure between the trunk lid driving device 30 and the third fixed joint part F3 is a ball joint.

The moving nut 41 is screwed to the screw shaft 40, and the first socket 43 attached to the moving nut 41 is rotatably connected to the first ball part 21a of the drive link 21. As a result, by driving the trunk lid driving device 30 to reciprocate the moving nut 41 on the screw shaft 40, a distance L3 between the first ball part 21a and the second ball part 13a (the third fixed joint part F3) is increased and decreased, and the drive link 21 is swung.

Here, the third fixed joint part F3 (the second ball part 13a) is arranged at the rear side of the vehicle 10 with respect to the first fixed joint part F1, and is arranged at the lower side (the lower side in the figure) of the vehicle 10 with respect to the first fixed joint part F1. Thus, in the trunk lid driving device 30, in the state in which the tire house interference region AR is avoided, the side of the screw shaft 40 is directed toward the front side and the upper side of the vehicle 10, and the side of the motor part 50 is directed toward the rear side and the lower side of the vehicle 10.

That is, the trunk lid driving device 30 is installed so as to extend in the front-rear direction of the vehicle 10 in which a space margin is provided while avoiding the tire house interference region AR. Further, by adopting the arrangement structure using the link mechanism 20 (the four-joint link mechanism) as described above, the side of the motor part 50 (an armature shaft 56) in the axial direction of the trunk lid driving device 30 is arranged at the rear side of the vehicle 10 with respect to the screw shaft 40. Therefore, maintenance work such as connector wiring of the motor part 50 can be easily performed from the opening portion of the trunk 11.

As shown in FIG. 3 to FIGS. 5(a) and 5(b), the trunk lid driving device 30 is a feed screw type linear actuator using an electric motor. Then, the trunk lid driving device 30 is "driven to open" or "driven to close" by operating an operation switch (not shown) provided in a vicinity of the trunk lid 12 (see FIG. 1 and FIG. 2).

The trunk lid driving device 30 is provided with the screw shaft 40 and the motor part 50. The screw shaft 40 is made from a steel-made round rod, and the motor part 50 rotates the screw shaft 40 in forward and reverse directions.

The axial direction base end side (the right side in FIG. 4) of the screw shaft 40 enters the inside of a housing 51 from the axial direction distal end side of the housing 51 which forms the motor part 50. At the axial direction base end side of the screw shaft 40, a bearing support part 40a slightly smaller than the screw shaft 40 in diameter is provided. The bearing support part 40a is rotatably supported by a first ball bearing B1 mounted at the axial direction distal end side of the housing 51. More specifically, the axial direction base end side of the screw shaft 40 is rotatably supported by the first ball bearing B1 in a state in which the movement of the screw shaft 40 in the axial direction is regulated. On the other hand, the axial direction distal end side (the left side in FIG. 3) of the screw shaft 40 is a free end.

The screw shaft 40 is screwed with the moving nut 41 made of a resin material such as plastic. A bracket member 42 formed in a substantially L shape by pressing a steel plate or the like is fixed to the moving nut 41. Specifically, the bracket member 42 has a fixed piece 42a fixed to the axial direction central portion of the moving nut 41 and a fixed arm 42b bent at a right angle to the fixed piece 42a. The distal end side of the fixed arm 42b of the bracket member 42 is directed toward the axial direction distal end side of the screw shaft 40 at the radially outer side of the screw shaft 40.

The first socket 43 made of a resin material such as plastic is fixed to the distal end side of the fixed arm 42b. The first socket 43 is provided with a first spherical recess part 43a which is opened toward the radially outer side of the screw shaft 40, and the first ball part 21a (see FIG. 1 and FIG. 2) of the drive link 21 is rotatably connected to the first spherical recess part 43a. Here, the first socket 43 constitutes a connection part in the disclosure.

When the trunk lid driving device 30 is driven to rotate the screw shaft 40 in the clockwise direction, the moving nut 41 moves in the axial direction of the screw shaft 40 and approaches the housing 51. That is, the trunk lid driving device 30 is "driven to close" from the state shown in FIG. 2 to the state shown in FIG. 1, and the opened trunk lid 12 is closed (CLOSE).

On the other hand, when the trunk lid driving device 30 is driven to rotate the screw shaft 40 in the counterclockwise direction, the moving nut 41 moves in the axial direction of the screw shaft 40 and moves away from the housing 51 (see the broken line in FIG. 3). That is, the trunk lid driving device 30 is "driven to open" from the state shown in FIG. 1 to the state shown in FIG. 2, and the closed trunk lid 12 is opened (OPEN).

In this way, the first socket 43 having the first spherical recess part 43a to which the first ball part 21a is connected is provided at the radially outer side of the screw shaft 40 and is reciprocated in this portion in the axial direction of the screw shaft 40. Therefore, it is possible to set the length of the screw shaft 40 according to the specification of the link mechanism 20 (the length of each link, etc.). Specifically, adopting the link mechanism 20 capable of widely opening the trunk lid 12 with a small moving distance of the moving nut 41 makes it possible to shorten the screw shaft 40, so as to reduce the size and the weight of the trunk lid driving device 30. In this case, since the length of the screw shaft 40 is simply set to the length as desired, the design modification can be easily coped with.

The motor part (the motor) 50 is provided with the housing (the motor case) 51 formed of a magnetic material such as a steel material or the like in a substantially cylindrical shape. The second socket 52 is provided integrally at the outer side and at the axial direction base end side of the housing 51. The second socket 52 is provided with a second spherical recess part 52a opened in the same direction as the first spherical recess part 43a of the first socket 43. The second ball part 13a (the third fixed joint part F3) provided on the vehicle body 13 is rotatably connected to the second spherical recess part 52a.

A pair of permanent magnets 53, each having a substantially arcuate cross section, is fixed to the inner wall at the axial direction base end side of the housing 51. And, an armature (rotor) 55 around which a coil 54 is wound is rotatably provided at the radially inner side of the pair of permanent magnets 53 with a predetermined gap in between. And, the armature shaft (rotation shaft) 56 is fixed in the rotation center of the armature 55. In this way, the armature 55 and the armature shaft 56 are rotatably accommodated inside the housing 51. Here, the armature shaft 56 is arranged at the axis center of the motor part 50, so that the screw shaft 40 and the armature shaft 56 are respectively provided on the same axis C.

A rectifier 58 in sliding contact with a pair of brushes 57 is provided at a portion closer to the second socket 52 than the armature 55 in the axial direction of the armature shaft 56. In addition, the rectifier 58 is electrically connected to the end part of the coil 54. As a result, a drive current is supplied to the coil 54 of the armature 55 via the brushes 57 and the rectifier 58. Accordingly, an electromagnetic force is generated in the armature 55, and the armature 55 is rotated together with the armature shaft 56 in a predetermined rotation direction and number of rotations.

Here, a connector connecting portion (not shown) to which an external connector (not shown) at the side of the vehicle 10 is connected is provided in the housing 51. Then, based on the operation of the operation switch, the drive current is supplied from the external connector to the connector connecting portion.

The axial direction base end side of the armature shaft 56 (the right side in FIG. 4) is rotatably supported by the second ball bearing B2. The second ball bearing B2 is fixed to the bottom at the axial direction base end side of the housing 51. As a result, the axial direction base end side of the armature shaft 56 can smoothly rotate inside the housing 51 without rattling.

On the other hand, a first sun gear 61 constituting a first planetary gear speed reducer 60 is fixed to the axial direction distal end side (the left side in FIG. 4) of the armature shaft 56, and the first sun gear 61 is rotatably supported by a third ball bearing B3 fixed to a substantially central portion of the housing 51 in the axial direction. That is, the axial direction distal end side of the armature shaft 56 is rotatably supported by the third ball bearing B3 through the first sun gear 61. Therefore, the axial direction distal end side of the armature shaft 56 can smoothly rotate inside the housing 51 without rattling.

The first planetary gear speed reducer 60 and a second planetary gear speed reducer 70 serving as a speed reducing device are rotatably accommodated inside the axial direction distal end side of the housing 51. Here, in the present embodiment, the first planetary gear speed reducer 60 and the second planetary gear speed reducer 70 set to a predetermined speed reducing ratio overlap in the axial direction of the housing 51 in "two stages", so as to obtain a large speed reducing ratio while suppressing upsizing of the entire speed reducing device in the radial direction.

As a result, the upsizing of the trunk lid driving device 30 in the radial direction is suppressed, and the entire shape of the trunk lid driving device 30 is formed in a stepless, substantially straight shape.

As shown in FIG. 4 and FIG. 5(a), the first planetary gear speed reducer 60 includes the first sun gear 61, three first planetary gears 62, a first carrier 63, and a first ring gear 64. The first sun gear 61 is fixed to the axial direction distal end side of the armature shaft 56. The three first planetary gears 62 are engaged with the first sun gear 61 and roll around the first sun gear 61. The first carrier 63 rotatably supports the first planetary gears 62. The first ring gear 64 is formed on the inner wall of the housing 51 and the respective first planetary gears 62 are engaged with the first ring gear 64.

As a result, rotation of the armature shaft 56 is decelerated and the torque is increased, and this rotating force with the increased torque is output from the first carrier 63 toward the second planetary gear speed reducer 70.

As shown in FIG. 4 and FIG. 5(b), the second planetary gear speed reducer 70 includes a second sun gear 71, three second planetary gears 72, a second carrier 73, and a second ring gear 74. The second sun gear 71 is integrally provided on the first carrier 63 of the first planetary gear speed reducer 60. The three second planetary gears 72 are engaged with the second sun gear 71 and roll around the second sun gear 71. The second carrier 73 rotatably supports these second planetary gears 72. The second ring gear 74 is formed on the inner wall of the housing 51 and the respective second planetary gears 72 are engaged with the second ring gear 74.

As a result, rotation of the first carrier 63 of the first planetary gear speed reducer 60 is decelerated and the torque is increased, and this rotating force with the increased torque is output from the second carrier 73 toward the screw shaft 40.

The second carrier 73 is rotatably supported by the housing 51 through a fourth ball bearing B4. As a result, both sides of the speed reducing device formed by overlapping the first planetary gear speed reducer 60 and the second planetary gear speed reducer 70 are respectively rotatably supported by the third ball bearing B3 and the fourth ball bearing B4. Therefore, the first planetary gear speed reducer 60 and the second planetary gear speed reducer 70 can smoothly rotate inside the housing 51 without rattling.

A serration part 40b provided at the axial direction base end side of the screw shaft 40 is inserted into the rotation center of the second carrier 73 so as to rotate integrally. That is, the axial direction base end side of the screw shaft 40 is rotatably supported by both the first ball bearing B1 and the fourth ball bearing B4. As a result, the rigidity of the screw shaft 40 at the axial direction base end side is sufficiently secured, and the cantilever state of the screw shaft 40 is realized.

As described above, the first planetary gear speed reducer 60 and the second planetary gear speed reducer 70 are provided between the armature shaft 56 and the screw shaft 40, and these are respectively arranged on the same axis C. Then, the first planetary gear speed reducer 60 and the second planetary gear speed reducer 70 decelerate the rotation of the armature shaft 56 and transmit the torque to the screw shaft 40. In other words, the armature shaft 56 rotates the screw shaft 40 through the first planetary gear speed reducer 60 and the second planetary gear speed reducer 70. This suppresses the increase in width dimension in the direction intersecting with the axial direction of the trunk lid driving device 30 and realizes a slim straight shape of the trunk lid driving device 30.

Next, the operation of the trunk lid driving device 30 formed as described above will be described in detail with reference to the drawings.

As shown in FIG. 6(a), in the closed state where the trunk lid 12 is closed, the moving nut 41 is arranged at a first position P1 close to the armature shaft 56 (the motor part 50) in the axial direction of the screw shaft 40. At this time, the drive link 21 is in a substantially vertically standing state, and a line segment connecting the first movable joint part K1 and the second movable joint part K2 is in a state of extending in a substantially horizontal direction. As a result, the intermediate link 23 is also set in the state of extending in the substantially horizontal direction, and the trunk lid 12 is set to the closed state (CLOSE).

When the operation switch (not shown) is "operated to open" to rotate the armature shaft 56 (see FIG. 4) of the motor part 50 in one direction (the counterclockwise direction), the moving nut 41 moves toward the axial direction distal end side of the screw shaft 40 as indicated by an arrow M1. That is, the moving nut 41 moves on the screw shaft 40 and moves away from the armature shaft 56 (the motor part 50).

As a result, as shown in FIG. 6(*b*), the drive link 21 swings around the first fixed joint part F1, the first movable joint part K1 moves in the direction of an arrow R1, and the drive link 21 is gradually inclined. Along with this movement, the second movable joint part K2 moves in the direction of an arrow R2, and the follower link 22 slightly swings around the second fixed joint part F2.

Therefore, the line segment connecting the first movable joint part K1 and the second movable joint part K2 gradually approaches the standing state, and the intermediate link 23 also approaches the standing state. As a result, the trunk lid 12 is opened as indicated by an arrow M2.

After that, by continuing to rotate the armature shaft 56 of the motor part 50, the moving nut 41 moves further toward the axial direction distal end side of the screw shaft 40 as indicated by an arrow M3. As a result, as shown in FIG. 6(*c*), the drive link 21 is further swung to come to a state of extending in the substantially horizontal direction. Then, the moving nut 41 is stopped at a substantially middle portion in the axial direction of the screw shaft 40 (STOP). Here, the moving nut 41 on the screw shaft 40 is stopped, for example, by monitoring a cumulative value of the number of rotations of the screw shaft 40 with an in-vehicle controller (not shown).

Then, the line segment connecting the first movable joint part K1 and the second movable joint part K2 is in the substantially standing state, and accordingly the intermediate link 23 is also in the substantially standing state. As a result, the trunk lid 12 comes to the opened state (OPEN). In this way, in the opened state where the trunk lid 12 is opened, the moving nut 41 is arranged at a second position P2 distant from the armature shaft 56 (the motor part 50) with respect to the first position P1 in the axial direction of the screw shaft 40.

However, in order to change from the state where the trunk lid 12 is opened as shown in FIG. 6(*c*) to the state where the trunk lid is closed as shown in FIG. 6(*a*), contrary to the above, the operation switch may be "operated to close", so that the armature shaft 56 (see FIG. 4) of the motor part 50 is rotated in the other direction (the clockwise direction).

As described in detail above, according to the trunk lid driving device 30 of the present embodiment, since the armature shaft 56 and the screw shaft 40 are provided on the same axis C and the first socket 43 is provided at the radially outer side of the screw shaft 40, it is possible to realize the trunk lid driving device 30 in the so-called "one-axis structure".

As a result, the trunk lid driving device 30 can be substantially rod-shaped to reduce its width direction dimension, and the capacity of the trunk 11 can be made larger than before. Since the trunk lid driving device 30 is substantially rod-shaped, the trunk lid driving device 30 can be installed so as to extend in the front-rear direction of the vehicle 10 in which a space margin is provided without compromising the design flexibility of the side of the vehicle 10.

Further, according to the trunk lid driving device 30 of the present embodiment, the first planetary gear speed reducer 60 and the second planetary gear speed reducer 70 are provided between the armature shaft 56 and the screw shaft 40 to reduce the rotation of the armature shaft 56 and transmit the torque to the screw shaft 40.

In this way, since the first planetary gear speed reducer 60 and the second planetary gear speed reducer 70 can be provided coaxially with respect to both the armature shaft 56 and the screw shaft 40, a housing with increased rigidity as required in the related art is unnecessary. Therefore, it is possible to reduce the weight of the trunk lid driving device 30.

Furthermore, according to the trunk lid driving device 30 of the present embodiment, the driving object is the trunk lid 12 provided at the rear of the vehicle 10, and the armature shaft 56 is provided at the rear side of the vehicle 10 with respect to the screw shaft 40.

As a result, maintenance work such as connector wiring of the motor part 50 can be easily performed from the opening portion of the trunk 11.

Further, according to the trunk lid driving device 30 of the present embodiment, when the trunk lid 12 is closed, the moving nut 41 is arranged at the first position P1 close to the armature shaft 56 in the axial direction of the screw shaft 40, and when the trunk lid 12 is opened, the moving nut 41 is arranged at the second position P2 distant from the armature shaft 56 with respect to the first position P1 in the axial direction of the screw shaft 40.

In this way, when the trunk lid 12 is closed, the moving nut 41 can be arranged at the base end side of the screw shaft 40 in the cantilever state. Therefore, when the trunk lid 12 is closed, that is, when the vehicle 10 is running, rattling of the moving nut 41 and the link mechanism 20 is effectively suppressed. Consequently, it is possible to improve the quietness at the time when the vehicle 10 is running, and it is particularly suitable for an electronic vehicle (EV) etc. which pursues quietness.

Next, a trunk lid driving device according to Embodiment 2 of the disclosure will be described in detail with reference to the drawings. Parts having the same functions as those of the above-described Embodiment 1 are denoted by the same reference numerals, and the detailed description thereof will be omitted.

Figure 7:
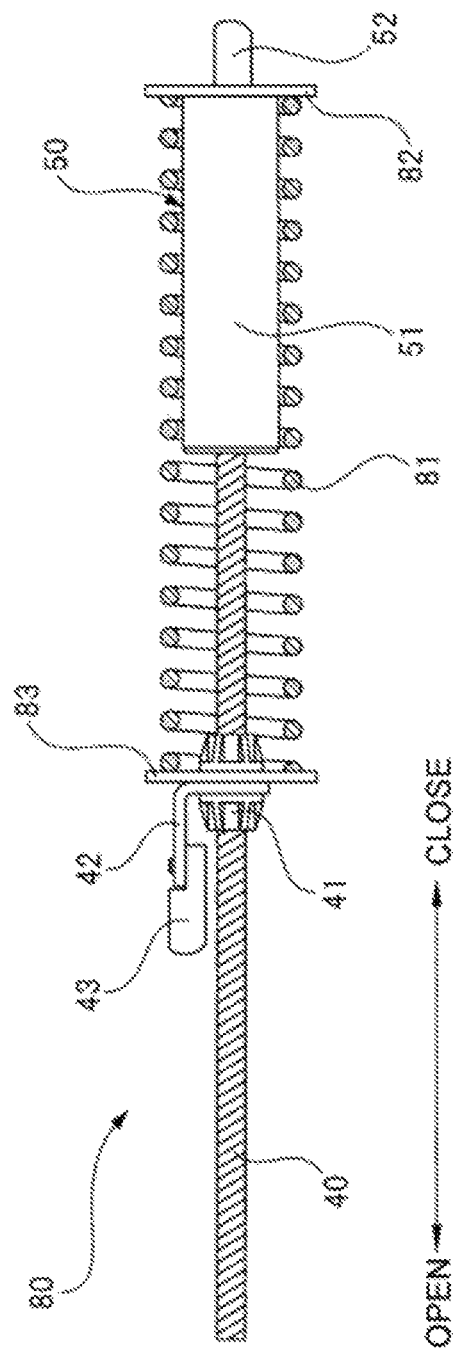
FIG. 7 is a plane view showing the trunk lid driving device of Embodiment 2 alone.

FIG. 7 illustrates a plan view showing the trunk lid driving device of Embodiment 2 alone.

As shown in FIG. 7, Embodiment 2 differs from Embodiment 1 in that a coil spring 81 serving as an elastic member is provided around a trunk lid driving device (opening/closing body driving device) 80.

Specifically, a first spring seat 82 serving as one spring support portion is provided at the side of the second socket 52 in the axial direction of the housing 51 which forms the motor part 50. The first spring seat 82 is formed to be substantially disc-shaped so as to protrude toward the radially outer side of the housing 51 and supports the axial direction base end side (the right side in the figure) of the coil spring 81.

On the other hand, the moving nut 41 is provided with a second spring seat 83 serving as another spring support portion. The second spring seat 83 is formed to be substantially disc-shaped so as to protrude toward the radially outer side of the moving nut 41 and supports the axial direction distal end side (the left side in the figure) of the coil spring 81.

In both of the "trunk lid closed state" shown in FIG. 1 and the "trunk lid opened state" shown in FIG. 2, the coil spring 81 is held between the first spring seat 82 and the second spring seat 83 so as not to rattle. That is, the coil spring 81 is provided between the housing 51 and the moving nut 41 and urges the moving nut 41 in a direction away from the housing 51. Also, in the "trunk lid opened state" (see FIG. 2), the coil spring 81 is mounted between the first spring seat 82 and the second spring seat 83 to be applied with a predetermined initial load.

The trunk lid driving device 80 of Embodiment 2 formed as described above can also achieve the same effects as those of the above-described Embodiment 1.

In addition to this, in the trunk lid driving device 80 of Embodiment 2, it is possible to assist the movement of the moving nut 41 in a direction away from the motor part 50 by using the spring force of the coil spring 81. Therefore, it is possible to open the trunk lid 12 with a lighter output of the motor part 50 against a relatively large reaction force acting on the link mechanism 20 (see FIG. 1). That is, the motor part 50 can be downsized and power can be saved. Further, it is possible to prevent an unintended closing operation due to the weight of the trunk lid 12.

Next, another arrangement structure of the trunk lid driving device according to Embodiment 3 of the disclosure will be described in detail with reference to the drawings. Parts having the same functions as those of the above-described Embodiment 1 are denoted by the same reference numerals, and the detailed description thereof will be omitted.

Figure 8A:
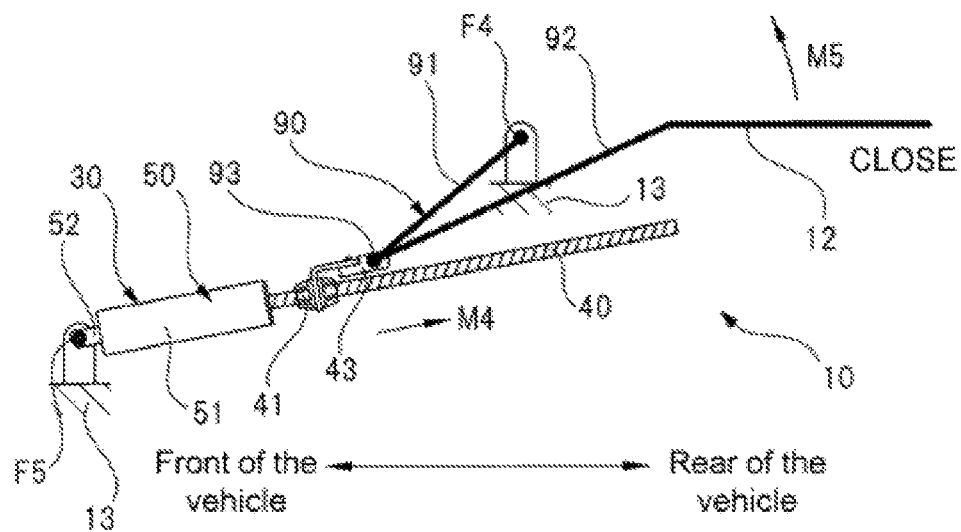
FIGS. 8(a) and 8(b) are views for illustrating operation of another arrangement structure of the trunk lid driving device (Embodiment 3).
Figure 8B:
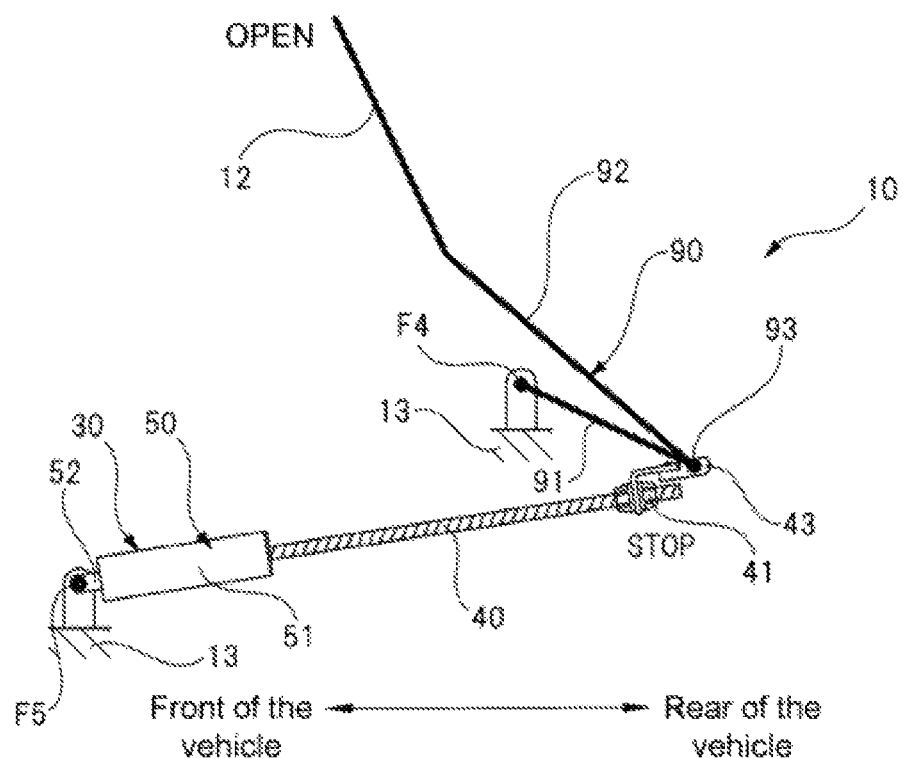

FIGS. 8(*a*) and 8(*b*) illustrate views for showing operation of another arrangement structure of the trunk lid driving device (Embodiment 3).

As shown in FIGS. 8(*a*) and 8(*b*), in Embodiment 3, the shape of the "arm" provided between the trunk lid 12 and the trunk lid driving device 30 is different from that in Embodiment 1. That is, although the link mechanism 20 (see FIG. 1) is provided between the trunk lid 12 and the trunk lid driving device 30 in Embodiment 1, a feed hinge 90 formed in a substantially V shape is provided between the trunk lid 12 and the trunk lid driving device 30 in Embodiment 3.

Here, in FIGS. 8(*a*) and 8(*b*), the trunk lid 12 and the feed hinge 90 are schematically shown, and the feed hinge 90 constitutes the arm in the disclosure. Compared with the link mechanism 20 according to Embodiment 1, the feed hinge 90 having a simple shape is used in Embodiment 3, so along with this, the front/rear arrangement relationship of the trunk lid driving device 30 is opposite to that in Embodiment 1.

Specifically, the feed hinge 90 includes a first arm part 91 and a second arm part 92 longer than the first arm part 91, and the longitudinal direction distal end part of the first arm part 91 is rotatably supported by the fourth fixed joint part F4 of the vehicle body 13. On the other hand, the vehicle front side of the trunk lid 12 is fixed to the longitudinal direction distal end part of the second arm part 92. The longitudinal direction base end parts of the first arm part 91 and the second arm part 92 are firmly fixed to a third ball part 93 by welding or the like. In addition, the third ball part 93 is rotatably connected to the first socket 43.

Here, the second socket 52 provided in the housing 51 of the motor part 50 is rotatably connected to a fifth fixed joint part F5 of the vehicle body 13 arranged at the front side of the vehicle 10 with respect to the fourth fixed joint part F4. More specifically, the fifth fixed joint part F5 is arranged at the front side of the vehicle 10 and at the lower side (the lower side in the figure) of the vehicle 10 with respect to the fourth fixed joint part F4. Also, the third ball part 93 is swung like a pendulum at the rear side of the vehicle 10 with respect to the fifth fixed joint part F5 and at the lower side of the vehicle 10 with respect to the fourth fixed joint part F4.

Then, when the trunk lid 12 is opened from the closed state (CLOSE) shown in FIG. 8(*a*), the armature shaft 56 (see FIG. 4) of the motor part 50 is rotated in one direction (the counterclockwise direction). Then, the moving nut 41 moves toward the axial direction distal end side of the screw shaft 40, as indicated by an arrow M4. As a result, the feed hinge 90 is swung around the fourth fixed joint part F4, and the trunk lid 12 is opened as indicated by an arrow M5.

Specifically, as shown in FIG. 8(*b*), the third ball part 93 is moved like a pendulum at the lower side with respect to the fourth fixed joint part F4 and moved to the rear side of the vehicle 10 with respect to the fourth fixed joint part F4. As a result, as shown in FIG. 8(*b*), the state (OPEN) where the trunk lid 12 is opened is rendered. Then, the moving nut 41 is stopped around the distal end portion of the screw shaft 40 in the axial direction (STOP).

In the arrangement structure of the trunk lid driving device 30 of Embodiment 3 formed as described above, the front/rear arrangement relationship of the trunk lid driving device 30 is opposite to that in Embodiment 1. For this reason, compared to Embodiment 3, Embodiment 1 is superior in maintainability of the trunk lid driving device 30 and can be arranged without the concern for the tire house interference region AR (see FIG. 1).

On the other hand, Embodiment 3 provides the following merits. Since Embodiment 3 does not drive the complicated link mechanism 20 but simply drives the feed hinge 90 in a simple shape, it is possible to simplify the structure of the side of the vehicle 10 and more effectively suppress occurrence of rattling of the trunk lid 12 when the vehicle 10 is running.

The disclosure is not limited to each of the above embodiments, and it goes without saying that various changes can be made without departing from the gist of the embodiments of the disclosure. For example, in the above-described embodiments, the disclosure is applied to the trunk lid driving devices 30 and 80 for opening and closing the trunk lid 12 of the sedan type vehicle 10, but the disclosure is not limited to this and can also be applied to the opening/closing body driving device, etc. for opening and closing the rear gate (opening/closing body) of a minivan or the like.

In addition, the material, shape, size, number, installation location, etc. of the constituent elements in each of the above embodiments are arbitrary as long as the disclosure can be achieved and are not limited to the above embodiments.

What is claimed is:

1. An opening/closing body driving device for driving an opening/closing body, and the opening/closing body driving device comprising:
    a motor, having a rotation shaft;
    a screw shaft, being rotated by the rotation shaft;
    a moving nut, being screwed to the screw shaft and moved in an axial direction of the screw shaft;
    a bracket member, being provided at the moving nut; and
    a connection part, being provided at the moving nut through the bracket member, wherein an arm for opening and closing the opening/closing body is connected to the connection part,
    wherein the rotation shaft and the screw shaft are respectively provided on the same axis, and
    the connection part is provided at a radially outer side of the screw shaft.

2. The opening/closing body driving device according to claim 1, wherein
    a planetary gear speed reducer that reduces a rotation of the rotation shaft is provided between the rotation shaft and the screw shaft.

3. The opening/closing body driving device according to claim 1, wherein
the opening/closing body is a trunk lid provided at rear of a vehicle, and
the rotation shaft is provided at a rear side of the vehicle with respect to the screw shaft.

4. The opening/closing body driving device according to claim 3, wherein
when the trunk lid is closed, the moving nut is arranged at a first position close to the rotation shaft in the axial direction of the screw shaft,
when the trunk lid is opened, the moving nut is arranged at a second position distant from the rotation shaft with respect to the first position in the axial direction of the screw shaft.

5. The opening/closing body driving device according to claim 4, wherein
the rotation shaft is rotatably accommodated in a motor case, and
an elastic member is provided between the motor case and the moving nut to urge the moving nut in a direction away from the motor case.

6. The opening/closing body driving device according to claim 2, wherein
the opening/closing body is a trunk lid provided at rear of a vehicle, and
the rotation shaft is provided at a rear side of the vehicle with respect to the screw shaft.

7. The opening/closing body driving device according to claim 6, wherein
when the trunk lid is closed, the moving nut is arranged at a first position close to the rotation shaft in the axial direction of the screw shaft,
when the trunk lid is opened, the moving nut is arranged at a second position distant from the rotation shaft with respect to the first position in the axial direction of the screw shaft.

8. The opening/closing body driving device according to claim 7, wherein
the rotation shaft is rotatably accommodated in a motor case, and
an elastic member is provided between the motor case and the moving nut to urge the moving nut in a direction away from the motor case.

9. The opening/closing body driving device according to claim 4, wherein
the bracket member comprises a fixed arm being bent toward the second position, and
the connection part is provided at the fixed arm.

* * * * *